(12) United States Patent
Saito et al.

(10) Patent No.: US 11,828,225 B2
(45) Date of Patent: Nov. 28, 2023

(54) CONTROL DEVICE, CONTROL METHOD, AND PROGRAM

(71) Applicant: MITSUBISHI HEAVY INDUSTRIES, LTD., Tokyo (JP)

(72) Inventors: Akihiko Saito, Tokyo (JP); Hidekazu Yamashita, Yokohama (JP); Jun Sasahara, Yokohama (JP); Koichiro Yano, Yokohama (JP); Yosuke Kitauchi, Yokohama (JP); Mizuhiko Tanaka, Yokohama (JP); Masahiro Yoshida, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/953,704

(22) Filed: Sep. 27, 2022

(65) Prior Publication Data

US 2023/0014316 A1 Jan. 19, 2023

Related U.S. Application Data

(63) Continuation of application No. PCT/JP2021/013276, filed on Mar. 29, 2021.

(30) Foreign Application Priority Data

Apr. 2, 2020 (JP) ................. 2020-066463

(51) Int. Cl.
*F02C 9/26* (2006.01)
*F02C 3/055* (2006.01)
*F02C 3/16* (2006.01)

(52) U.S. Cl.
CPC ............... *F02C 3/055* (2013.01); *F02C 3/16* (2013.01); *F02C 9/26* (2013.01)

(58) Field of Classification Search
CPC .... F02C 3/055; F02C 3/16; F02C 9/26; F02C 9/28; F05D 2270/02
See application file for complete search history.

(56) References Cited

U.S. PATENT DOCUMENTS

2002/0108366 A1* 8/2002 Saitoh .................. F01K 23/101
60/39.182
2007/0169463 A1 7/2007 Tanaka et al.
(Continued)

FOREIGN PATENT DOCUMENTS

JP 2004-60615 2/2004
JP 2007-177626 7/2007
(Continued)

OTHER PUBLICATIONS

International Search Report dated May 18, 2021 in International Application No. PCT/JP2021/013276.
(Continued)

*Primary Examiner* — Steven M Sutherland
(74) *Attorney, Agent, or Firm* — Wenderoth, Lind & Ponack, L.L.P.

(57) ABSTRACT

A control device for adjusting an amount of fuel to be supplied to a gas turbine based on a rotational speed of the gas turbine, such that a frequency of electric power output by a power generator that generates electric power using the gas turbine is within a given range, includes a load value acquisition unit configured to acquire a load value that is a value of a load applied to the power generator after cutoff of a part of the load applied to the power generator when the part of the load applied to the power generator is cut off, an arithmetic unit configured to calculate an adjusted value that is a value of the load different from the load value by carrying out an arithmetic operation on the load value and a bias, and a command unit configured to adjust the amount of
(Continued)

fuel by outputting a first signal for causing the power generator to output electric power corresponding to the adjusted value.

7 Claims, 6 Drawing Sheets

(56) References Cited

U.S. PATENT DOCUMENTS

| | | | |
|---|---|---|---|
| 2014/0230449 A1 | 8/2014 | Saito et al. | |
| 2018/0223742 A1* | 8/2018 | Demougeot | ............ F02C 7/057 |
| 2021/0148291 A1 | 5/2021 | Yamamoto et al. | |

FOREIGN PATENT DOCUMENTS

| | | |
|---|---|---|
| JP | 2008-259366 | 10/2008 |
| JP | 4256688 | 4/2009 |
| JP | 4451997 | 4/2010 |
| JP | 2019-120138 | 7/2019 |
| WO | 2008/126399 | 10/2008 |
| WO | 2013/080894 | 6/2013 |
| WO | 2013/113201 A1 | 8/2013 |

OTHER PUBLICATIONS

Written Opinion of the International Searching Authority dated May 18, 2021 in International Application No. PCT/JP2021/013276, with English-language translation.

* cited by examiner

CONTROL DEVICE, CONTROL METHOD, AND PROGRAM

CROSS-REFERENCE TO RELATED APPLICATIONS

This application is a Continuation Application based on International Application No. PCT/JP2021/013276, filed Mar. 29, 2021, which claims priority on Japanese Patent Application No. 2020-066463, filed Apr. 2, 2020, the contents of which are incorporated herein by reference.

TECHNICAL FIELD

The present disclosure relates to a control device, a control method, and a program.

BACKGROUND ART

Patent Document 1 discloses technology for maintaining a load amount within an operation limit of a turbine in a power plant by performing a power generation process according to an internal load amount when an independent operation within the power plant is performed due to a power system failure.

RELATED ART DOCUMENTS

Patent Document

Patent Document 1

Japanese Unexamined Patent Application. First Publication No. 2008-259366

SUMMARY OF INVENTION

Problem to be Solved by the Invention

In an internal power generation facility that supplies electric power to an internal factory or the like and receives/transmits electric power from/to an external power system, a load applied to an internal power generator changes due to cutoff of the external power system and a frequency of electric power output by the power generator can change temporarily. Technology for adjusting electric power to be output by the power generator based on an internal load applied to the power generator after the above-described cutoff such that the frequency is stabilized is known. However, even if the adjustment is made, the frequency may change greatly due to inertia when the load of the external power system to be cut off is greater than the internal load.

An objective of the present disclosure is to provide a control device, a control method, and a program for solving the above-described problems.

Means for Solving the Problem

According to the present disclosure, there is provided a control device for adjusting an amount of fuel to be supplied to a gas turbine based on a rotational speed of the gas turbine such that a frequency of electric power output by a power generator that generates electric power using the gas turbine is within a given range, the control device including: a load value acquisition unit configured to acquire a load value that is a value of a load applied to the power generator after cutoff of a part of the load applied to the power generator when the part of the load applied to the power generator is cut off; an arithmetic unit configured to calculate an adjusted value that is a value of the load different from the load value by carrying out an arithmetic operation on the load value and a bias; and a command unit configured to adjust the amount of fuel by outputting a first signal for causing the power generator to output electric power corresponding to the adjusted value.

According to the present disclosure, there is provided a control method for use in a control device for adjusting an amount of fuel to be supplied to a gas turbine based on a rotational speed of the gas turbine such that a frequency of electric power output by a power generator that generates electric power using the gas turbine is within a given range, the control method including: a step of acquiring a load value that is a value of a load applied to the power generator after cutoff of a part of the load applied to the power generator when the part of the load applied to the power generator is cut off; a step of calculating an adjusted value that is a value different from the load value by carrying out an arithmetic operation on the load value and a bias; and a step of adjusting the amount of fuel by outputting a first signal for causing the power generator to output electric power corresponding to the adjusted value.

According to the present disclosure, there is provided a program for causing a computer of a control device for adjusting an amount of fuel to be supplied to a gas turbine based on a rotational speed of the gas turbine such that a frequency of electric power output by a power generator that generates electric power using the gas turbine is within a given range to execute: a step of acquiring a load value that is a value of a load applied to the power generator after cutoff of a part of the load applied to the power generator when the part of the load applied to the power generator is cut off; a step of calculating an adjusted value that is a value different from the load value by carrying out an arithmetic operation on the load value and a bias; and a step of adjusting the amount of fuel by outputting a first signal for causing the power generator to output electric power corresponding to the adjusted value.

Effect of the Invention

According to at least one of the above-described aspects, when a part of a load applied to a power generator is cut off, it is possible to stabilize a frequency of electric power by limiting a change in a frequency of electric power output by the power generator.

EMBODIMENTS FOR CARRYING OUT THE INVENTION

First Embodiment (Configuration of Control System)

Hereinafter, an embodiment is described in detail with reference to the drawings.

Figure 1:
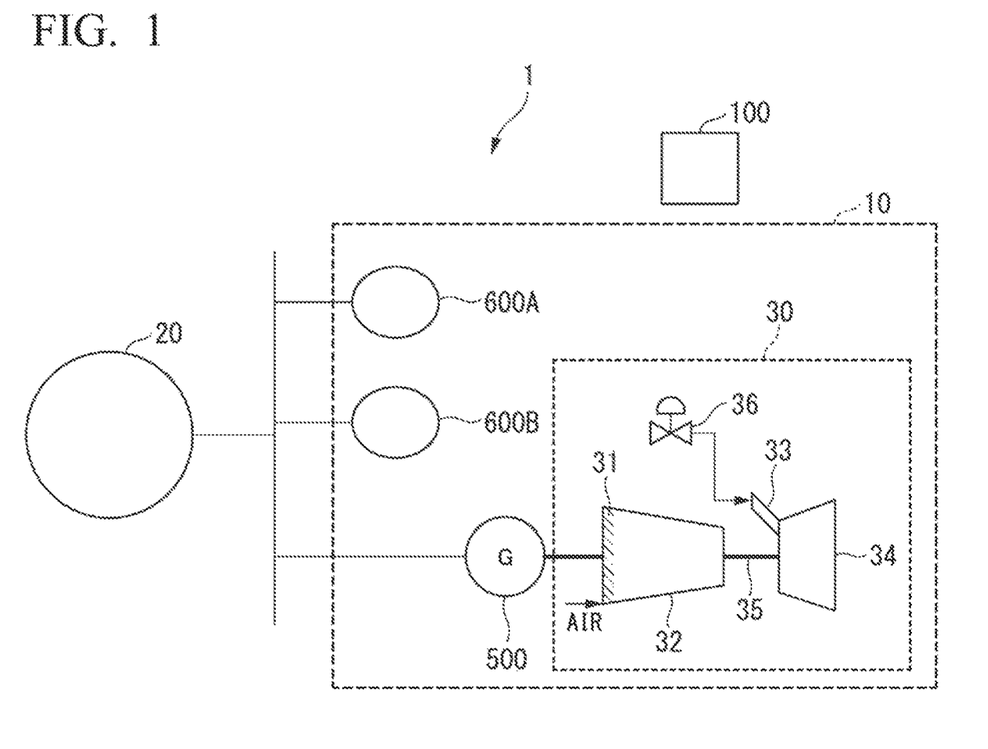
FIG. 1 is a diagram showing a configuration of a control system according to an embodiment.

FIG. 1 is a diagram showing a configuration of a control system 1 according to a first embodiment.

The control system 1 includes an internal power system 10, an external power system 20, and a control device 100.

The power system is a system in which a power generation process and a power transmission and reception process for supplying electric power output by a power generator to a power reception facility are integrated.

The control system 1 is a system that supplies fuel related to a value obtained by carrying out an arithmetic operation on a load applied to the internal power system 10 and a bias when the load applied to the external power system 20 is cut off. Thereby, the control system 1 can stabilize a frequency of the electric power by limiting a change in the frequency of the electric power output by the internal power system 10.

The load represents electric power that is consumed by a facility or the like.

When the load applied to the external power system 20 is cut off, an amount by which the load is changed due to the cutoff is also referred to as a lost load.

The internal power system 10 generates electric power at a factory facility equipped with a power generator 500, supplies electric power to an internal facility 600, and receives electric power from the external power system 20.

The external power system 20 receives electric power from the internal power system 10 and supplies electric power to the internal power system 10. The external power system 20 is connected to the internal power system 10 through an electric wire or the like.

The control device 100 is a device that adjusts an amount of fuel supplied to the power generator 500 based on a value obtained by carrying out an arithmetic operation on the load applied to the power generator 500 and the bias when a part of the load applied to the power generator 500 is cut off. Thereby, the control device IOM can stabilize the frequency of the electric power by limiting the change in the frequency of the electric power output by the power generator 500.

(Configuration of Internal Power System)

Hereinafter, a configuration of the internal power system 10 is described.

The internal power system 10 includes a gas turbine 30, the power generator 500, and the internal facility 600.

The gas turbine 30 includes an inlet guide vane (IGV) 31, a compressor 32, a combustor 33, a turbine 34, a rotor 35, and a fuel valve 36.

The IGV 31 is provided on an inlet side of the compressor 32 and adjusts a flow rate of air flowing into the compressor 32.

The compressor 32 generates compressed air by compressing the inflowing air.

The combustor 33 mixes the air compressed by the compressor 32 with the fuel to generate high-temperature combustion gas. Examples of the above-described fuel include light oil, kerosene, natural gas, hydrogen, by-product gas of a blast furnace, and coal gasification gas.

The turbine 34 rotates the rotor 35 with the combustion gas and drives the power generator 500.

The rotor 35 connects the turbine 34 and the power generator 500 and is rotated by the turbine 34, such that the electric power generated by the turbine 34 is transmitted to the power generator 500 and the power generator 500 is driven.

The fuel valve 36 adjusts a flow rate of the fuel gas supplied to the combustor 33.

The combustor 33 is a device that generates a high-temperature and high-pressure combustion gas by mixing the fuel supplied via the fuel valve 36 with air and burning it. The fuel valve 36 is a valve that adjusts the flow rate of fuel supplied to the combustor 33 in response to a signal transmitted from the control device 100.

The power generator 500 is a device that outputs electric power using motive power generated by the gas turbine 30. The power generator 500 connects an internal facility 600A, an internal facility 600B, the gas turbine 30, and the external power system 20.

The internal facility 600 is a mechanical facility that operates by supplying the electric power output by the power generator 50 in the factory facility where the internal power system 10 is present.

The facility that outputs electric power in the internal power system 10 is the power generator 500. In the internal power system 10, facilities that consume electric power are the internal facility 600A and the internal facility 600B. The load of the internal facility 600A is referred to as a load L1. The load of the internal facility 600B is referred to as a load L2.

(External Power System)

The external power system 20 is a system including a facility configured to receive the supplied electric power output from the power generator 500 of the internal power system 10 and consumes electric power of a load L3 and a power generator (not shown) configured to supply electric power to the internal power system 10 and the like.

(Configuration of Control Device)

Hereinafter, a configuration of the control device 100 will be described.

Figure 2:
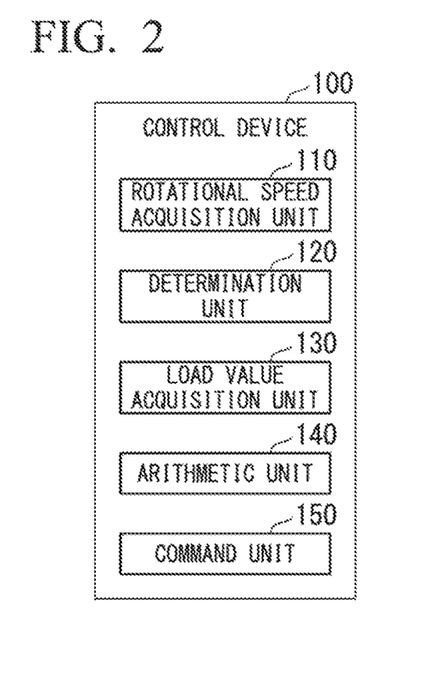
FIG. 2 is a schematic block diagram showing a configuration of a control device according to the embodiment.

FIG. 2 is a schematic block diagram showing the configuration of the control device 100.

The control device 100 includes a rotational speed acquisition unit 110, a determination unit 120, a load value acquisition unit 130, an arithmetic unit 140, and a command unit 150.

The rotational speed acquisition unit 110 acquires a rotational speed of the turbine 34 provided in the gas turbine 30.

The determination unit 120 determines whether or not the load of the external power system 20 is cut off. For example, the determination unit 120 is connected to a breaker (not shown) provided between the internal power system 10 and the external power system 20 and determines that cutoff of the load of the external power system 20 occurs when receiving a signal indicating cutoff from the breaker. When not receiving a signal indicating cutoff from the breaker, the determination unit 120 determines that the load of the external power system 20 is not cut off.

The load value acquisition unit 130 acquires a load value when the determination unit 120 determines that the load of the external power system 20 is cut off. The load value is a value of the load applied to the power generator 500 when the load of the external power system 20 is cut off.

When the load of the external power system 20 is not cut off, the value of the load applied to the power generator 500 becomes a value obtained by carrying out an addition operation on the value of the load of the external power system 20 and the value of the load of the internal power system 10. That is, when the load of the external power system 20 is not cut off, the value of the load applied to the power generator 500 becomes a value obtained by carrying out an addition operation on the load U, the load L2, and the load L3.

On the other hand, when the load of the external power system 20 is cut off, the value of the load applied to the power generator 500 becomes the value of the load of the internal power system 10. That is, when the load of the external power system 20 is cut off, the value of the load applied to the power generator 500 becomes a value obtained by carrying out an addition operation on the loads L1 and L2. Hereinafter, the value obtained by carrying out the addition operation on the loads L1 and L2 is referred to as an internal load.

The load value acquisition unit 130 is connected to the internal facility 600A and the internal facility 600B and receives the value of the load L1 and the value of the load L2. Subsequently, the load value acquisition unit 130 acquires a load value by carrying out the addition operation on the value of the load L1 and the value of the load L2. That is, the load value becomes the same value as the internal load.

The arithmetic unit 140 calculates an adjusted value by carrying out an arithmetic operation on the load value acquired by the load value acquisition unit 130 and a preset bias. The adjusted value is a value of the load different from the load value. An example of the bias is a negative real number. That is, the arithmetic unit 140 calculates the adjusted value that is less than the value of the internal load. Electric power corresponding to the adjusted value is lower than electric power indicated by the value of the internal load. Examples of a value obtained by carrying out the arithmetic operation on the load value and the bias in the arithmetic unit 140 include a value obtained by carrying out an addition operation on the load value and the bias and a value obtained by carrying out a multiplication operation on the load value and the bias.

The command unit 150 outputs a signal to the fuel valve 36 and adjusts the amount of fuel to be supplied to the combustor 33 such that the frequency of the electric power output by the power generator 500 is within a given range. Examples of the above-described given range include a frequency greater than or equal to 49.5 Hz and less than or equal to 50.5 Hz.

Hereinafter, an operation of the command unit 150 is specifically described.

The command unit 150 adjusts the amount of fuel by outputting the signal to the fuel valve 36 based on the rotational speed of the turbine 34 acquired by the rotational speed acquisition unit 110 such that the frequency of the electric power output by the power generator 500 is within the given range. For example, when the rotational speed of the turbine 34 acquired by the rotational speed acquisition unit 110 exceeds the given range, the command unit 150 outputs a signal for decreasing the amount of fuel to the fuel valve 36. Thereby, the amount of fuel supplied by the fuel valve 36 to the combustor 33 is decreased. Therefore, the rotational speed of the turbine 34 is decreased. That is, when the rotational speed of the turbine 34 exceeds the given range, the command unit 150 can make the rotational speed set within the given range. The frequency of the electric power output by the power generator 500 varies with the rotational speed of the turbine 34. Thus, the control system 1 can set the frequency of the electric power output by the power generator 500 within the given range according to an operation of the command unit 150.

The command unit 150 outputs a signal for increasing the amount of fuel to the fuel valve 36 when the rotational speed of the turbine 34 acquired by the rotational speed acquisition unit 110 is less than the given range that is preset. Thereby, the amount of fuel to be supplied by the fuel valve 36 to the combustor 33 is increased. Thus, the rotational speed of the turbine 34 is increased. That is, when the rotational speed of the turbine 34 is less than the given range, the command unit 150 can make the rotational speed set within the given range. Thus, the control system 1 can set the frequency of the electric power output by the power generator 500 within the given range according to the operation of the command unit 150.

Also, when the load of the external power system 20 is cut off, the command unit 150 outputs a first signal for outputting the power corresponding to the adjusted value to the power generator 500 to the fuel valve 36 and adjusts the amount of fuel to be supplied to the combustor 33.

Hereinafter, an operation of the control system 1 when the command unit 150 adjusts the amount of fuel by outputting the first signal is described.

When a part of the load of the external power system 20 is cut off, the determination unit 120 determines that the load of the external power system 20 is cut off. Subsequently, the load value acquisition unit 130 acquires a load value. The arithmetic unit 140 calculates an adjusted value based on the load value acquired by the load value acquisition unit 130 and the bias. The command unit 150 outputs the first signal to the fuel valve 36 to adjust the amount of fuel to be supplied to the combustor 33 such that the power generator 500 outputs the electric power corresponding to the adjusted value.

When the load of the external power system 20 is not cut off, the electric power output by the power generator 500 corresponds to a value obtained by carrying out an addition operation on values of the internal load and the load 13. On the other hand, when the load of the external power system 20 is cut off, the fuel valve 36 receives the first signal as a fuel command value from the command unit 150 and adjusts the amount of fuel to be supplied to the combustor 33. Thereby, the electric power output by the power generator 500 corresponds to the internal load.

Figure 3:
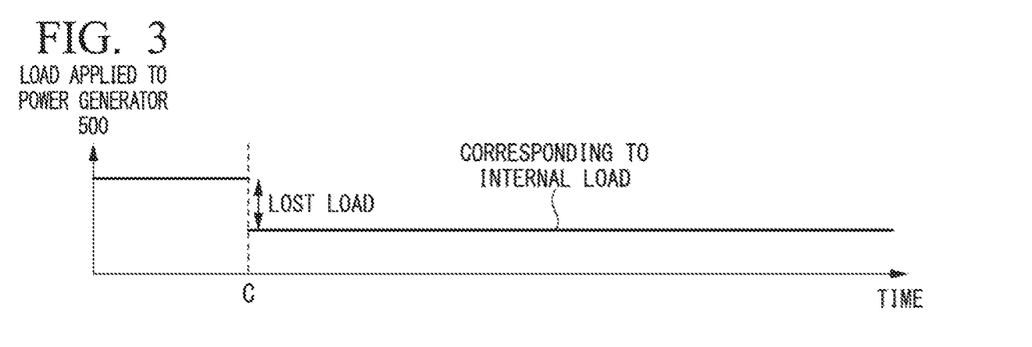
FIG. 3 is a graph showing a load applied to a power generator according to the embodiment.

FIG. 3 is a graph showing a change in the load applied to the power generator 500 when the load of the external power system 20 is cut off. The vertical axis of the graph in FIG. 3 represents a load applied to the power generator 500. The horizontal axis of the graph in FIG. 3 represents time. Time C in FIG. 3 indicates a time when cut off of the load of the external power system 20 occurs.

As shown in FIG. 3, the load applied to the power generator 500 becomes lower after time C than before. The load applied to the power generator 500 before time C is a value obtained by carrying out an addition operation on the values of the internal load and the load L3. On the other hand, when the load L3 is cut off at time C, a lost load occurs and the load applied to the power generator 500 is decreased. That is, after time C, the load applied to the power generator 500 is the value of the internal load.

Figure 4:
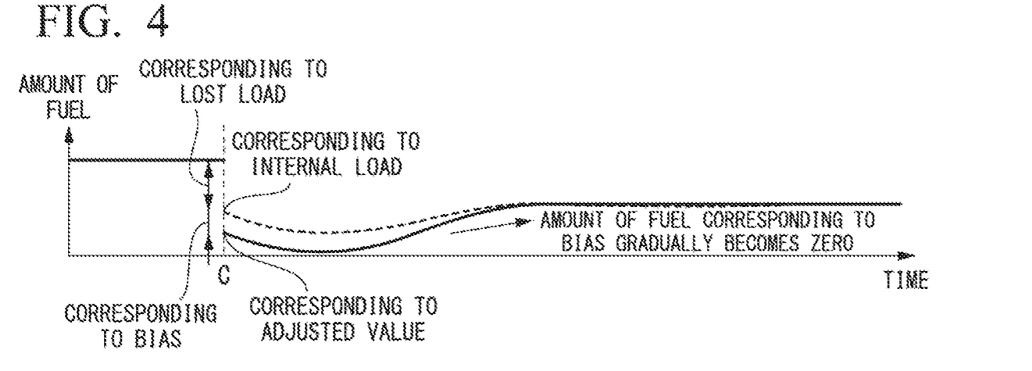
FIG. 4 is a graph showing an amount of fuel supplied to a combustor according to the embodiment.

FIG. 4 is a graph showing an amount of fuel supplied to the combustor 33 by the fuel valve 36 according to the fuel command value when the load of the external power system 20 is cut off. The vertical axis in the graph of FIG. 4 represents an amount of fuel supplied to the combustor 33 by the fuel valve 36. The horizontal axis of the graph in FIG. 4 represents time. The solid line in the graph of FIG. 4 indicates an amount of fuel supplied to the combustor 33 of the control system 1. The dotted line in the graph of FIG. 4 indicates an amount of fuel supplied to a combustor of a system other than the control system 1 (hereinafter referred to as another system) when the amount of fuel is adjusted by the other system. The other system adjusts the amount of fuel to be supplied to the combustor based on the load value, unlike the control system 1 which adjusts the amount of fuel based on the adjusted value. The other system and the control system 1 have similar configurations, except for the adjustment of the amount of fuel described above.

As shown in FIG. 3, the load applied to the power generator 500 at time C is decreased by an amount for the lost load. Thus, the load value acquisition unit 130 acquires a value of the internal load as the load value. The arithmetic unit 140 calculates an adjusted value by carrying out an arithmetic operation on the acquired load value and the bias. The command unit 150 outputs the first signal indicating the amount of fuel to the fuel valve 36 based on the adjusted value. As shown in FIG. 4, the fuel valve 36 receives the first signal as a fuel command value and decreases the amount of fuel to be supplied to the combustor 33.

The fuel valve of the other system also decreases the amount of fuel to be supplied to the combustor at time C. However, the other system that adjusts the amount of fuel based on the load value instead of the adjusted value supplies a larger amount of fuel to the combustor after time C than the control system 1. Because the control system 1 supplies the combustor 33 with the amount of fuel based on the adjusted value, the control system 1 supplies the combustor 33 with a smaller amount of fuel decreased by an amount corresponding to the bias compared with the other system that adjusts the amount of fuel based on the load value.

After time C, the command unit 150 of the control system 1 outputs a second signal, which is a signal for changing the electric power output by the power generator 500 from the adjusted value to the value corresponding to the load value over time and adjusts the amount of fuel. Thereby, the fuel valve 36 receives the signal as the fuel command value and adjusts the amount of fuel to be supplied to the combustor 33. That is, an amount of fuel corresponding to the bias gradually becomes zero.

Likewise, after time C, the command unit of the other system also outputs a signal to the fuel valve such that the frequency of the electric power output by the power generator is within a given range. Thereby, the fuel valve receives the signal and adjusts the amount of fuel to be supplied to the combustor 33.

At time C, the amount of fuel supplied by the fuel valve 36 of the control system 1 is different from the amount of fuel supplied by the fuel valve of the other system. However, because the internal load after time C is similar, the amount of fuel supplied by the fuel valve 36 of the control system 1 is similar to the amount of fuel supplied by the fuel valve of the other system.

Figure 5:
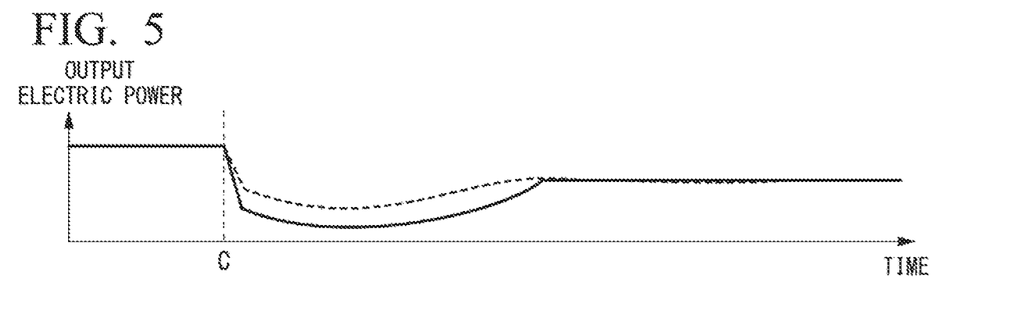
FIG. 5 is a graph showing electric power output by the power generator according to the embodiment.

FIG. 5 is a graph showing the electric power output by the power generator 500 when the load of the external power system 20 is cut off. The vertical axis in the graph of FIG. 5 represents electric power output by the power generator 500. The horizontal axis in the graph of FIG. 5 represents time. The solid line in the graph of FIG. 5 indicates the electric power output by the power generator 500 of the control system 1. The dotted line in the graph of FIG. 5 indicates electric power output by the power generator of the other system.

Before time C, the electric power output by the power generator 500 corresponds to a value obtained by adding the value of the load L3 to the value of the internal load. On the other hand, when the load for the lost load is cut off at time C, the electric power output by the power generator 500 corresponds to the adjusted value. After a given period of time passes from time C, the electric power output by the power generator 500 corresponds to the internal load according to the signal output by the command unit 150.

On the other hand, the electric power output by the power generator of the other system after time C corresponds to the internal load. That is, the electric power output by the power generator of the other system after time C is greater than the electric power output by the power generator 500 of the control system 1 after time C by an amount corresponding to the bias. After the given period of time passes from time C, the electric power output by the power generator 500 of the control system 1 is similar to the electric power output by the power generator of the other system.

Figure 6:
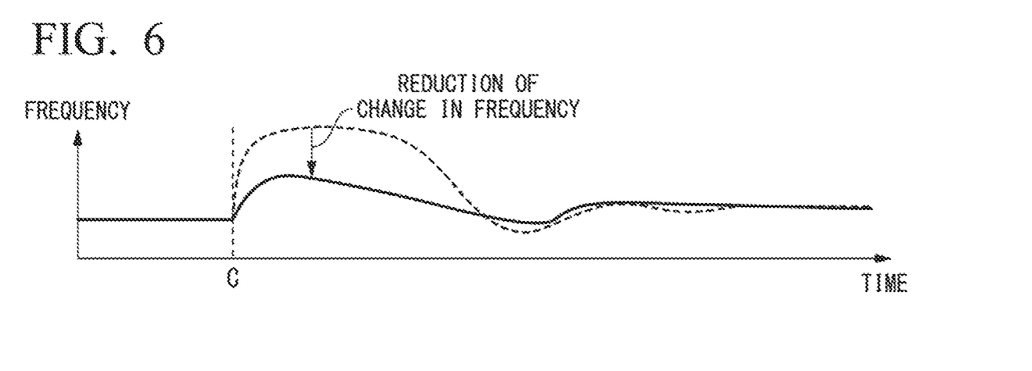
FIG. 6 is a graph showing a frequency of electric power output by the power generator according to the embodiment.

FIG. 6 is a graph showing the frequency of the electric power output by the power generator 500 when the load of the external power system 20 is cut off. The vertical axis in the graph of FIG. 6 represents a frequency of the electric power output by the power generator 5). The horizontal axis of the graph in FIG. 6 represents time. The solid line in the graph of FIG. 6 indicates a frequency of electric power output by the power generator 500 of the control system 1. The dotted line in the graph of FIG. 6 indicates a frequency of electric power output by the power generator of the other system.

Before time C, the frequency of the electric power output by the power generator 500 is kept within a given range according to the signal output by the command unit 150. Immediately after time C, the frequency of the electric power output by the power generator 500 temporarily increases. Although the load applied to the power generator 500 is decreased by an amount for the lost load front time C as shown in FIG. 3, the electric power output by the power generator 500 is gradually decreased during a given period of time from time C as shown in FIG. 5. Thus, immediately after time C, a surplus is generated in the electric power output by the power generator 500 and the frequency of the electric power output by the power generator 500 is temporarily increased by inertia or the like due to the surplus.

As shown in FIG. 5, until the given period of time elapses from time C, the electric power output by the power generator 500 of the control system 1 is less than the electric power output by the power generator of the other system. Thereby, until the given period of time elapses from time C, the surplus in the electric power output by the power generator 500 of the control system 1 is less than the surplus in the electric power output by the power generator of the other system. Thus, until the given period of time elapses from time C, a change in the frequency of the electric power output by the power generator 500 of the control system 1 is less than a change in the frequency of the electric power output by the power generator of the other system. That is, when the load of the external power system 20 is cut off, the control system 1 can stabilize the frequency of the electric power by limiting the change in the frequency of the electric power output by the power generator 500 as compared with the other system.

Figure 7:
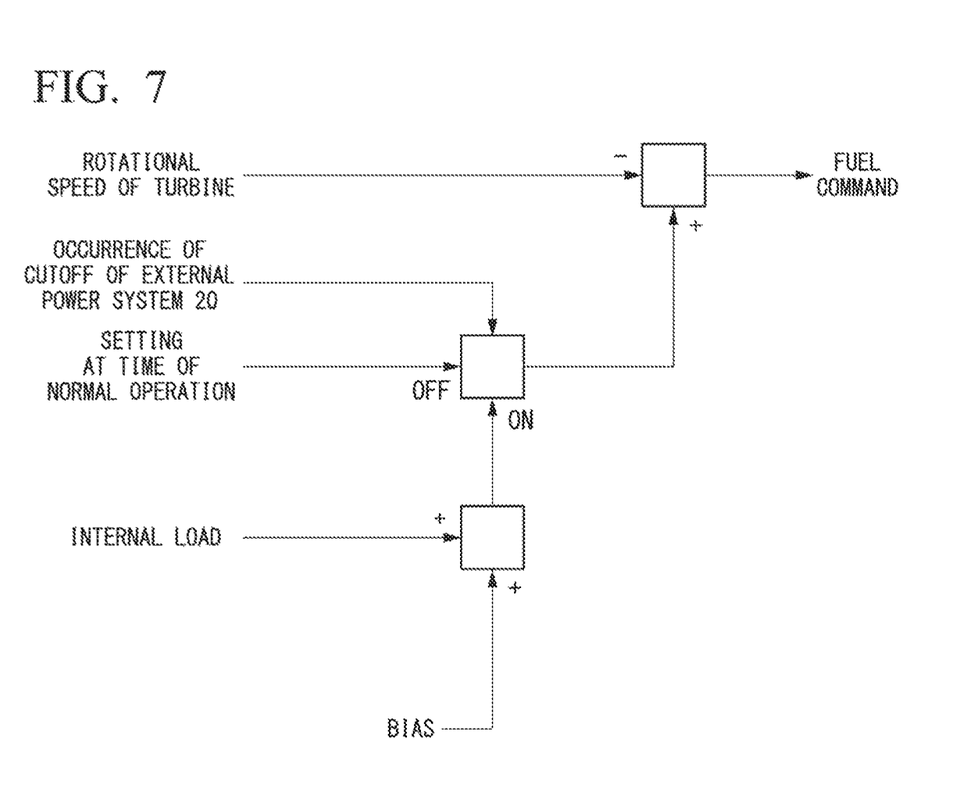
FIG. 7 is a circuit diagram showing a control process of the control system according to the embodiment.

FIG. 7 is a circuit diagram showing a control process of the control system 1.

When the control system 1 is in normal operation, the control system 1 issues a fuel command based on the rotational speed of the turbine 34. Thereby, the control system 1 adjusts the frequency of the electric power output by the power generator 500 such that the frequency is within a given range.

On the other hand, when the load of the external power system 20 is cut off, the control system 1 issues a fuel command based on the internal load and the bias.
(Operation of Control System)

Hereinafter, the operation of the control system 1 when the load of the external power system 20 is cut off is described.

Figure 8:
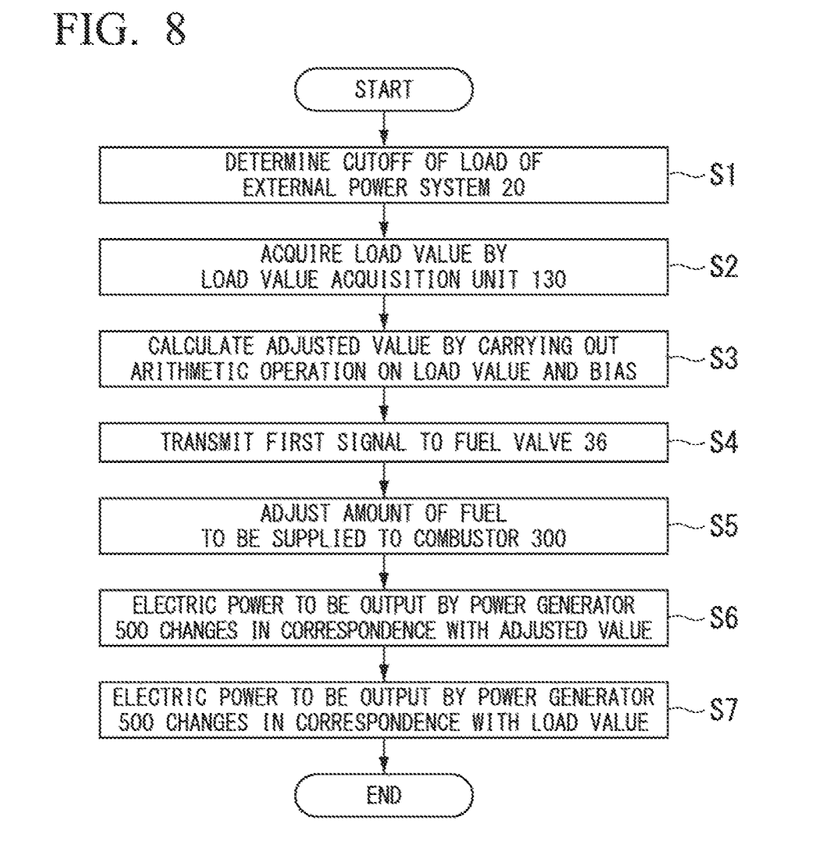
FIG. 8 is a flowchart showing an operation of the control system according to the embodiment.

FIG. 8 is a flowchart showing the operation of the control system 1 when the load of the external power system 20 is cut off.

The load of the external power system 20 is cut off. Subsequently, the determination unit 120 receives a signal indicating the cutoff from the breaker and determines that the load of the external power system 20 is cut off (step S1).

The load value acquisition unit 130 acquires a load value from the internal facility 600A and the internal facility 600B (step S2). That is, the load value acquisition unit 130 acquires the load value by acquiring a value of the load applied to the power generator 500.

The arithmetic unit 140 calculates an adjusted value by carrying out an arithmetic operation on the load value acquired by the load value acquisition unit 130 in step S2 and a preset bias (step S3).

The command unit 150 outputs a first signal to the fuel valve 36 based on the adjusted value calculated in step S3 (step S4).

The fuel valve 36 receives the signal of step S4 and adjusts an amount of fuel to be supplied to the combustor 33 (step S5). That is, the fuel valve 36 receives the signal output in step S4 as a fuel command value and decreases the amount of fuel to be supplied to the combustor 33.

Because the amount of fuel to be supplied to the combustor 33 in step S5 is small, the electric power output by the power generator 500 is low (step 6). According to step S6, the electric power output by the power generator 500 corresponds to a value obtained by subtracting the bias from the internal load.

The command unit 150 outputs a signal such that the electric power output by the power generator 500 corresponds to the internal load (step S7). Thereby, when a given period of time elapses from step S6, the electric power output by the power generator 500 corresponds to the load value.

When the load of the external power system 20 is cut off, the control system 1 adjusts the electric power output by the power generator 500 such that the electric power corresponds to the adjusted value. Thereby, the surplus in the electric power output by the power generator 500 is decreased immediately after the load of the external power system 20 is cut off. Thus, the control system 1 can stabilize the frequency of the electric power by limiting a change in the frequency of the electric power output by the power generator 500 when a part of the load applied to the power generator 500 is cut off.

In the control system 1, the control device 100 may be configured to be provided in the gas turbine 30. Even in this case, the command unit 150 of the control device 100 adjusts an amount of fuel to be supplied to the combustor 33 by outputting the first signal for causing the power generator 500 to output the electric power corresponding to the adjusted value to the fuel valve 36.

Modified Examples

Figure 9:
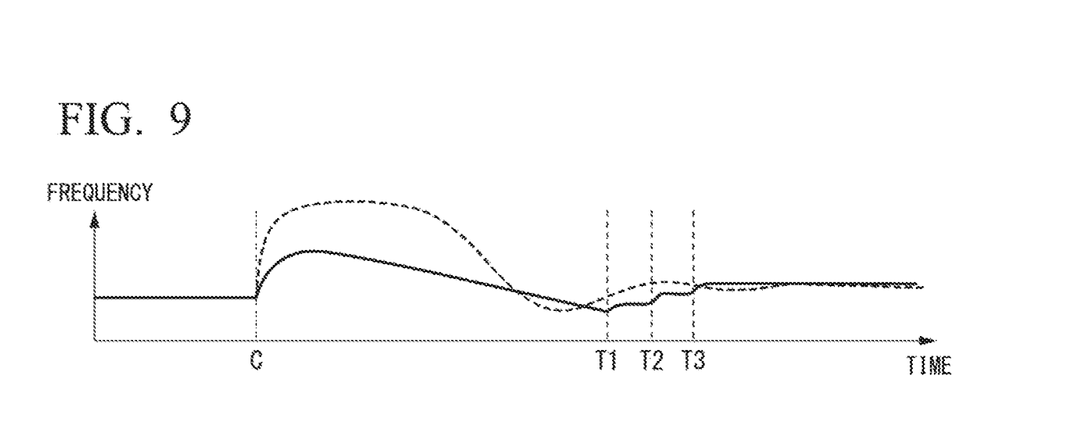
FIG. 9 is a graph showing a frequency of electric power output by the power generator according to the embodiment.

After the first signal is output, the command unit 150 may adjust the amount of fuel by outputting a plurality of signals such that the power generator 500 outputs electric power corresponding to the load value, FIG. 9 is a graph showing a frequency of an independent operation system for which the power generator 500 of the control system 1 is responsible according to a modified example.

For example, as shown in FIG. 9, after the first signal is transmitted at time C, the command unit 150 may output three signals at time T1, time T2, and time T3 and adjust a frequency of the independent operation system for which the power generator 500 is responsible step by step.
(Operation and Effects)

According to the present disclosure, the control device 100 for adjusting an amount of fuel to be supplied to the gas turbine 30 based on a rotational speed of the gas turbine 30 such that a frequency of electric power output by the power generator 500 that generates electric power using the gas turbine 30 is within a given range includes the load value acquisition unit 130 configured to acquire a load value that is a value of a load applied to the power generator 500 after cutoff when a part of the load applied to the power generator 500 is cut off; the arithmetic unit 140 configured to calculate an adjusted value that is a value of the load value different from the load value by carrying out an arithmetic operation on the load value and a bias; and the command unit 150 configured to adjust the amount of fuel by outputting a first signal for causing the power generator 500 to output electric power corresponding to the adjusted value.

When a pan of the load applied to the power generator 500 is cut off, the control device 10 adjusts the electric power output by the power generator 500 such that the electric power corresponds to the adjusted value. Thereby, the surplus in the amount of electric power output by the power generator 500 is decreased immediately after a part of the load applied to the power generator 500 is cut off. Thus, the control device 10 can stabilize the frequency of the electric power by limiting the change in the frequency of the electric power output by the power generator 500 when a part of the load applied to the power generator 500 is cut off.

After the first signal is output, the command unit 150 of the control device 100 according to the present disclosure adjusts the amount of fuel by outputting a second signal, which is a signal for changing the electric power output by the power generator 500 from an adjusted value to a value corresponding to a load value over time.

Thereby, when the load of the external power system 20 is cut off, the control device 100 can decrease the change in the frequency of the electric power output by the power generator 500 before and after the cutoff.

Also, when the load of the external power system 20 applied to the power generator 500 is cut off, the load value acquisition unit 130 of the control device 100 acquires the load value that is the value of the load applied to the power generator 500 after the cutoff.

When the load of the external power system 20 is cut off, the control device 100 adjusts the electric power output by the power generator 500 such that the electric power corresponds to the adjusted value. Thereby, the surplus in the electric power output by the power generator 500 is decreased immediately after the load of the external power system 20 is cut off. Thus, when the load of the external power system 20 is cut off, the control device 100 can stabilize the frequency of the electric power by limiting the change in the frequency of the electric power output by the power generator 500.

Second Embodiment (Configuration of Control System)

Hereinafter, a control system 1 according to a second embodiment is described. The control system 1 according to the second embodiment calculates a bias such that a value of a load of a power generator 500 decreased by cutting off a load of an external power system 20 is proportional to a bias. The control system 1 is a system that transmits a first signal to a fuel valve 36 such that the power generator 500 outputs electric power corresponding to an adjusted value by calculating the adjusted value based on the calculated bias.

Figure 10:
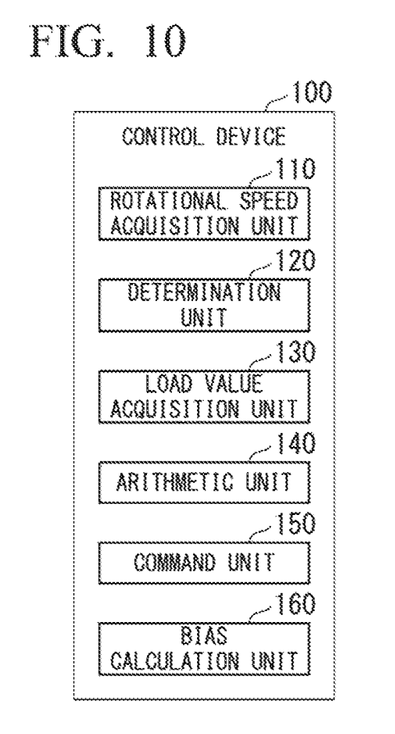
FIG. 10 is a schematic block diagram showing a configuration of a control device according to an embodiment.

A configuration of a control device 100 of the control system 1 according to the second embodiment is a configuration including a bias calculation unit 160 in addition to the configuration of the control device 100 of the control system 1 according to the first embodiment.

FIG. 10 is a schematic block diagram showing the configuration of the control device 100 according to the second embodiment.

The bias calculation unit 160 calculates the bias such that the value of the load of the power generator 500 (hereinafter referred to as the decreased value) decreased due to cutoff of the load of the external power system 20 is proportional to the bias. For example, the bias calculation unit 160 obtains the decreased value by subtracting the load value from a value obtained by carrying out an addition operation on a load L1, a load L2, and a load L3 stored in a storage device (not shown) provided in the control device 100. The decreased value due to the cutoff of the load of the external power system 20 is the same value as the load L3. Subsequently, the bias calculation unit 160 calculates the bias by multiplying the obtained decreased value by a preset coefficient. An example of the above-described coefficient is one or more real numbers. By calculating the bias in this way, the bias calculated by the bias calculation unit 160 is proportional to the decreased value.

The bias calculation unit 160 may calculate the bias according to an arithmetic operation other than a multiplication operation.

(Operation of Control System)

Hereinafter, an operation of the control system 1 when the load of the external power system 20 is cut off is described.

Figure 11:
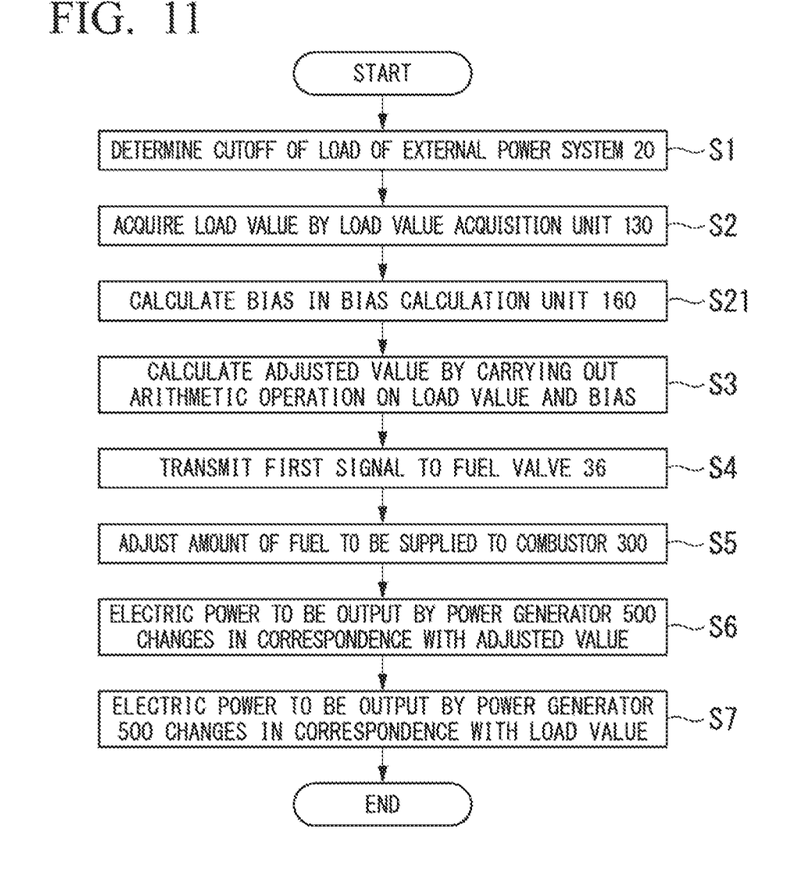
FIG. 11 is a flowchart showing an operation of a control system according to the embodiment.

FIG. 11 is a flowchart showing the operation of the control system 1 when the load of the external power system 20 is cut off.

The operations front step S1 to step S2 and front step S3 to step S9 are similar to the operations from step S1 to step S2 and from step S3 to step S9 in the control system 1 according to the first embodiment.

The bias calculation unit 160 obtains the decreased value based on the load value identified in step S2 and the value obtained by carrying out an addition operation on the load L1, the load L2, and the load L3 stored in the storage device. Also, the bias calculation unit 160 calculates the bias by multiplying the obtained decreased value by the preset coefficient (step S21).

The bias used when the arithmetic unit 140 calculates the adjusted value in step S3 is the bias calculated in step S21.

The control system 1 calculates the adjusted value based on the bias calculated based on the decreased value due to the cutoff of the load of the external power system 20. Also, the control system 1 outputs a first signal to the fuel valve 36 such that the electric power calculated by the power generator 500 corresponds to the adjusted value. Thereby, the control system 1 can adjust the electric power output by the power generator 500 in accordance with the decreased value due to the cutoff of the load of the external power system 20 and can further stabilize the frequency of the electric power.

(Operation and Effects)

The control device 100 according to the present disclosure includes the bias calculation unit 160 configured to calculate a bias such that the value of the load of the power generator 500 decreased due to cutoff is proportional to the bias, and the arithmetic unit 140 calculates the adjusted value by carrying out the arithmetic operation on the load value and the calculated bias.

The control device 100 calculates the adjusted value based on the bias calculated based on the decreased value due to the cutoff of the load of the external power system 20. Also, the control device 10 outputs the first signal to the fuel valve 36 such that the electric power calculated by the power generator 500 corresponds to the adjusted value. Thereby, the control device 10 can adjust the electric power output by the power generator 500 in accordance with the decreased value due to the cutoff of the load of the external power system 20 and can further stabilize the frequency of the electric power.

Other Embodiments

Although the above embodiments are described above in detail with reference to the drawings, the specific configuration is not limited to the above and various design changes can be made.

The control device 100 may calculate the bias based on operating conditions associated with at least one of the power generator 500 and the gas turbines 30. Examples of the operating conditions include an atmospheric temperature, a temperature of the power generator 500, a temperature of the gas turbine 30, and an amount of heat of fuel. For example, the control device 100 may include a first correction unit configured to correct the bias based on a value of at least one of a temperature of the gas turbine, an atmospheric temperature around the gas turbine, and an amount of heat of the fuel. The control device 100 can adjust the power output by the power generator 500 based on the adjusted value suitable for an operating condition by calculating the bias as described above and can stabilize the frequency of the electric power.

Also, the control device 100 may calculate the bias based on constraint conditions of the gas turbine 30 such as the surge of the compressor 32 and the combustion stability of the combustor 33. For example, the control device 100 may include a second correction unit configured to correct the bias based on a value of at least one of compressor surge occurring in the gas turbine and stability of the fuel.

The control device 100 can adjust the electric power output by the power generator 500 based on the adjusted value suitable for the constraint condition of the gas turbine 30 by calculating the bias as described above and can stabilize the frequency of the electric power.

(Configuration of Computer)

Figure 12:
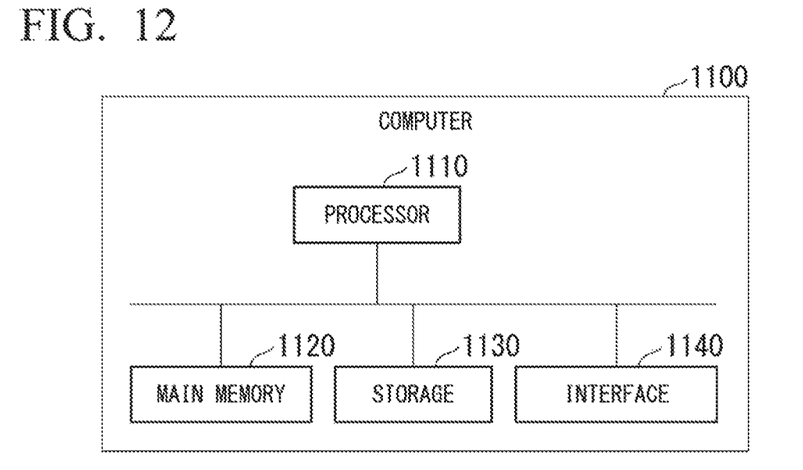
FIG. 12 is a schematic block diagram showing a configuration of a computer according to at least one embodiment.

FIG. 12 is a schematic block diagram showing a configuration of a computer according to at least one embodiment.

A computer 1100 includes a processor 1110, a main memory 1120, a storage 1130, and an interface 1140.

The above-described control system 1 is mounted in the computer 1100. The operation of each of the above-described processing units is stored in the storage 1130 in the form of a program. The processor 1110 reads a program from the storage 1130, loads the program into the main memory 1120, and executes the above process in accordance with the program. Also, the processor 1110 secures a storage area corresponding to each of the above-described storage units in the main memory 1120 in accordance with the program.

The program may be a program for implementing some of the functions exerted on the computer 1100. For example, the program may exert the function in combination with another program already stored in the storage 1130 or in combination with another program mounted in another device. In another embodiment, the computer 1100 may include a custom large scale integrated circuit (LSI) such as a programmable logic device (PLD) in addition to or in place of the above configuration. Examples of the PLD include a programmable array logic (PAIL), a generic army logic (GAL), a complex programmable logic device (CPLD), and a field programmable gate array (FPGA). In this case, some or all of the functions implemented by the processor 1110 may be implemented by the integrated circuit.

Examples of the storage 1130 include magnetic disks, magneto-optical disks, semiconductor memories, and the like. The storage 1130 may be internal media directly connected to a bus of the computer 1100 or external media connected to the computer via the interface 1140 or a communication circuit. Also, when the above program is distributed to the computer 1100 via a communication circuit, the computer 1100 receiving the distributed program may load the program into the main memory 1120 and execute the above process. In at least one embodiment, the storage 1130 is a non-transitory tangible storage medium.

Also, the program may be a program for implementing some of the above-mentioned functions. Furthermore, the program may be a so-called differential file (differential program) for implementing the above-described function in combination with another program already stored in the storage 1130.

APPENDIXES

The control device 100 described in each embodiment is ascertained, for example, as follows.

(1) According to the present disclosure, the control device 100 for adjusting an amount of fuel to be supplied to the gas turbine 30 based on a rotational speed of the gas turbine 30 such that a frequency of electric power output by the power generator 500 that generates electric power using the gas turbine 30 is within a given range includes the load value acquisition unit 130 configured to acquire a load value that is a value of a load applied to the power generator 500 after cutoff of a part of the load applied to the power generator 500 when the part of the load applied to the power generator 500 is cut off; the arithmetic unit 140 configured to calculate an adjusted value that is a value of the load different from the load value by carrying out an arithmetic operation on the load value and a bias; and the command unit 150 configured to adjust the amount of fuel by outputting a first signal for causing the power generator 500 to output electric power corresponding to the adjusted value.

When the part of the load applied to the power generator 500 is cut off, the control device 100 adjusts the electric power output by the power generator 500 such that the electric power corresponds to the adjusted value. Thereby, the surplus amount of electric power output by the power generator 500 is decreased immediately after the part of the load applied to the power generator 500 is cut off. Thus, the control device 100 can stabilize the frequency of the electric power by limiting a change in the frequency of the electric power output by the power generator 500 when the part of the load applied to the power generator 500 is cut off.

(2) According to the present disclosure, after the first signal is output, the command unit 150 of the control device 100 may adjust the amount of fuel by outputting a second signal, which is a signal for changing the electric power output by the power generator 500 from the adjusted value to a value corresponding to the load value over time.

Thereby, when the load of the external power system 20 is cut off, the control device 100 can decrease a change in the frequency of the electric power output by the power generator 500 before and after the cutoff.

(3) Also, the load value acquisition unit 130 of the control device 100 may acquire the load value, which is the value of the load applied to the power generator 500 after cutoff of a load of an external power system 20 applied to the power system 500, when the load of the external power system 20 applied to the power generator 500 is cut off.

When the load of the external power system 20 is cut off, the control device 100 adjusts the electric power output by the power generator 500 such that the electric power corresponds to the adjusted value. Thereby, the surplus amount of electric power output by the power generator 500 is decreased immediately after the load of the external power system 20 is cut off. Thus, the control device 100 can stabilize the frequency of the electric power by limiting a change in the frequency of the electric power output by the power generator 500 when the load of the external power system 20 is cut off.

(4) According to the present disclosure, the control device 100 may include the bias calculation unit 160 configured to calculate the bias such that a value of the load of the power generator 500 decreased due to the cutoff is proportional to the bias, wherein the arithmetic unit 140 may calculate the adjusted value by carrying out the arithmetic operation on the load value and the calculated bias.

The control device 100 calculates the adjusted value based on the bias calculated based on the decreased value due to the cutoff of the load of the external power system 20. Also, the control device 100 outputs the first signal to the fuel valve 36 such that the electric power calculated by the power generator 500 corresponds to the adjusted value. Thereby, the control system 1 can adjust the electric power output by the power generator 500 in accordance with the decreased value due to the cutoff of the load of the external power system 20 and can further stabilize the frequency of the electric power.

(5) The control device 100 may include a first correction unit configured to correct the bias based on a value of at least one of a temperature of the gas turbine, an atmospheric temperature around the gas turbine, and an amount of heat of the fuel.

Thereby, the control device 100 can correct the bias based on the operating conditions such as the temperature of the gas turbine and the atmospheric temperature, and can further stabilize the frequency of the electric power output by the power generator 500.

(6) The control device 100 may include a second correction unit configured to correct the bias based on a value of at least one of compressor surge occurring in the gas turbine and stability of the fuel.

Thereby, the control device 100 can correct the bias based on the constraint condition of the gas turbine such a, the compressor surge and can further stabilize the frequency of the electric power output by the power generator 500.

(7) According to the present disclosure, a control method for use in the control device 100 for adjusting an amount of fuel to be supplied to the gas turbine 30 based on a rotational speed of the gas turbine 30 such that a frequency of electric power output by the power generator 500 that generates electric power using the gas turbine 30 is within a given range includes a step of acquiring a load value that is a value of a load applied to the power generator 500 after cutoff of a part of the load applied to the power generator 500 when the part of the load applied to the power generator 500 is cut oPt, a step of calculating an adjusted value that is a value different from the load value by carrying out an arithmetic operation on the load value and a bias; and a step of adjusting the amount of fuel by outputting a first signal for causing the power generator 500 to output electric power corresponding to the adjusted value.

When the part of the load applied to the power generator 500 is cut off, a user of the control method can adjust the electric power output by the power generator 500 such that the electric power corresponds to the adjusted value. Thereby, the surplus amount of electric power output by the power generator 500 is decreased immediately after the part of the load applied to the power generator 500 is cut off. Thus, the user of the control method can stabilize the frequency of the electric power by limiting a change in the frequency of the electric power output by the power generator 500 when the part of the load applied to the power generator 500 is cut off.

(8) According to the present disclosure, a program for causing a computer of the control device 100 for adjusting an amount of fuel to be supplied to the gas turbine 30 based on a rotational speed of the gas turbine 30 such that a frequency of electric power output by the power generator 500 that generates electric power using the gas turbine 30 is within a given range to execute: a step of acquiring a load value that is a value of a load applied to the power generator 500 after cutoff of a part of the load applied to the power generator 500 when the part of the load applied to the power generator 500 is cut off; a step of calculating an adjusted value that is a value different from the load value by carrying out an arithmetic operation on the load value and a bias; and a step of adjusting the amount of fuel by outputting a first signal for causing the power generator 500 to output electric power corresponding to the adjusted value.

When the pan of the load applied to the power generator 500 is cut off, a user of the program can adjust the electric power output by the power generator 500 such that the electric power corresponds to the adjusted value. Thereby, the surplus amount of electric power output by the power generator 500 is decreased immediately after the part of the load applied to the power generator 500 is cut off. Thus, the user of the program can stabilize the frequency of the electric power by limiting a change in the frequency of the electric power output by the power generator 5M when the part of the load applied to the power generator 500 is cut off.

INDUSTRIAL APPLICABILITY

The present disclosure relates to a control device, a control method, and a program.

According to the present disclosure, when a part of a load applied to a power generator is cut off, it is possible to stabilize a frequency of electric power by limiting a change in a frequency of electric power output by the power generator.

The invention claimed is:

1. A control device for adjusting an amount of fuel to be supplied to a gas turbine based on a rotational speed of the gas turbine such that a frequency of electric power output by a power generator that generates electric power using the gas turbine is within a given range, the control device comprising:
    a load value acquisition unit configured to acquire a load value that is a value of a load applied to the power generator after cutoff of a part of the load applied to the power generator when the part of the load applied to the power generator is cut off;
    an arithmetic unit configured to calculate an adjusted value that is a value of the load different from the load value by carrying out an arithmetic operation on the load value and a bias; and
    a command unit configured to adjust the amount of fuel by outputting a first signal for causing the power generator to output electric power corresponding to the adjusted value,
    wherein, after the first signal is output, the command unit adjusts the amount of fuel by outputting a second signal which is a signal for changing the electric power output by the power generator from a value corresponding to the adjusted value to a value corresponding to the load value over time,
    the adjusted value is less than the load value,
    the command unit outputs the first signal so that the fuel with an amount based on the adjusted value that is less than an amount based on the load value is supplied to the gas turbine and the power generator is caused to output electric power corresponding to the adjusted value that is lower than electric power corresponding to the load value, and
    after the first signal is output, the command unit outputs the second value so that an amount of fuel corresponding to the bias gradually becomes zero, the amount of fuel supplied to the gas turbine is gradually changed from the amount based on the adjusted value to the amount based on the load value, and the electric power output by the power generator is changed from the value corresponding to the adjusted value to the value corresponding to the load value over time.

2. The control device according to claim 1, comprising a bias calculation unit configured to calculate the bias such that a value of the load of the power generator decreased due to the cutoff is proportional to the bias,
    wherein the arithmetic unit calculates the adjusted value by carrying out the arithmetic operation on the load value and the calculated bias.

3. The control device according to claim 1, comprising a first correction unit configured to correct the bias based on a value of at least one of a temperature of the gas turbine, an atmospheric temperature around the gas turbine, and an amount of heat of the fuel.

4. The control device according to claim 1, comprising a correction unit configured to correct the bias based on a value of at least one of compressor surge occurring in the gas turbine and stability of the fuel.

5. The control device according to claim 1, wherein the load value acquisition unit acquires the load value that is the value of the load applied to the power generator after cutoff of a load of an external power system applied to the power generator when the load of the external power system applied to the power generator is cut off.

6. A control method for use in the control device according to claim 1 for adjusting the amount of fuel to be supplied to the gas turbine based on the rotational speed of the gas turbine such that the frequency of electric power output by the power generator that generates electric power using the gas turbine is within the given range, the control method comprising:
- a step of acquiring the load value that is the value of the load applied to the power generator after cutoff of the part of the load applied to the power generator when the part of the load applied to the power generator is cut off;
- a step of calculating the adjusted value that is the value different from the load value by carrying out the arithmetic operation on the load value and the bias;
- a step of adjusting the amount of fuel by outputting the first signal for causing the power generator to output the electric power corresponding to the adjusted value,
- a step of changing the electric power output by the power generator to be low because the amount of fuel to be supplied to the gas turbine is decreased in the step of adjusting the amount of fuel, and
- a step of outputting the second signal so that when a given period of time elapses from the step of changing the electric power, the electric power output by the power generator is changed to the value corresponding to the load value.

7. A non-transitory computer readable storage medium that stores a program for causing a computer of the control device according to claim 1 for adjusting the amount of fuel to be supplied to the gas turbine based on the rotational speed of the gas turbine such that the frequency of electric power output by the power generator that generates electric power using the gas turbine is within the given range to execute:
- a step of acquiring the load value that is the value of the load applied to the power generator after cutoff of the part of the load applied to the power generator when the part of the load applied to the power generator is cut off;
- a step of calculating the adjusted value that is the value different from the load value by carrying out the arithmetic operation on the load value and the bias;
- a step of adjusting the amount of fuel by outputting the first signal for causing the power generator to output the electric power corresponding to the adjusted value,
- a step of changing the electric power output by the power generator to be low because the amount of fuel to be supplied to the gas turbine is decreased in the step of adjusting the amount of fuel, and
- a step of outputting the second signal so that when a given period of time elapses from the step of changing the electric power, the electric power output by the power generator is changed to the value corresponding to the load value.

* * * * *